(12) United States Patent
Dunbar et al.

(10) Patent No.: US 9,459,087 B2
(45) Date of Patent: Oct. 4, 2016

(54) MAGNETIC POSITION DETECTION SYSTEM

(71) Applicant: eZono AG, Jena (DE)

(72) Inventors: Allan Dunbar, Jena (DE); Rolf Henkel, Jena (DE)

(73) Assignee: EZONO AG, Jena (DE)

( * ) Notice: Subject to any disclaimer, the term of this patent is extended or adjusted under 35 U.S.C. 154(b) by 645 days.

(21) Appl. No.: 13/786,084

(22) Filed: Mar. 5, 2013

(65) Prior Publication Data

US 2014/0257746 A1 Sep. 11, 2014

(51) Int. Cl.
G01B 7/00 (2006.01)

(52) U.S. Cl.
CPC .................... G01B 7/003 (2013.01)

(58) Field of Classification Search
CPC .......... A61B 2019/5251; A61B 5/062; A61B 8/4254; G01B 7/003; G06F 3/046
See application file for complete search history.

(56) References Cited

U.S. PATENT DOCUMENTS

| | | |
|---|---|---|
| 4,317,078 A | 2/1982 | Weed |
| 4,508,119 A | 4/1985 | Tukamoto |
| 5,042,486 A | 8/1991 | Pfeiler |
| 5,055,813 A | 10/1991 | Johnson |
| 5,425,382 A | 6/1995 | Golden |
| 5,622,169 A | 4/1997 | Golden |
| 5,744,953 A | 4/1998 | Hansen |
| 5,767,669 A | 6/1998 | Hansen |
| 5,831,260 A | 11/1998 | Hansen |
| 5,833,608 A | 11/1998 | Acker |
| 5,879,297 A | 3/1999 | Haynor |

(Continued)

FOREIGN PATENT DOCUMENTS

| | | |
|---|---|---|
| AT | 492214 | 0/2011 |
| AT | 455499 | 2/2010 |

(Continued)

OTHER PUBLICATIONS

Stolowitz Ford Cowger LLP, Listing of Related Cases; Portland, OR; Aug. 19, 2015; 1 page.

(Continued)

*Primary Examiner* — Elias Desta
(74) *Attorney, Agent, or Firm* — Schwabe, Williamson & Wyatt (57) ABSTRACT

In a magnetic position detection system designed to detect a target object in a detection space using an array of magnetic sensors, the position of the target object can be determined by fitting a model of the target object's magnetic field to the sensor measurements. A robust determination of whether a target object is present can be obtained by fitting the model to the sensor measurements and determining the remaining differences between the fitted model and the sensor measurements. If the differences are high then the model is not fitting well, suggesting that the target object is not present. If the differences are low, the model is fitting well and the target object can be determined as being present. Measurements made when the target object is determined as not being present can be regarded as background field measurements including any stray fields. These stray fields can then be deducted from subsequent sensor measurements to eliminate the effect of stray fields and allow more accurate determination of the position of the target object. A user indicator may be included to indicate whether stray fields are not present, or present and accurately detected, or whether stray fields are varying.

45 Claims, 3 Drawing Sheets

(56) References Cited

U.S. PATENT DOCUMENTS

| | | |
|---|---|---|
| 5,902,238 A | 5/1999 | Golden |
| 5,941,889 A | 8/1999 | Cermak |
| 5,944,023 A | 8/1999 | Johnson |
| 5,953,683 A | 9/1999 | Hansen |
| 6,052,610 A | 4/2000 | Koch |
| 6,073,043 A | 6/2000 | Schneider |
| 6,172,499 B1 | 1/2001 | Ashe |
| 6,198,956 B1 | 3/2001 | Dunne |
| 6,216,028 B1 | 4/2001 | Haynor |
| 6,233,476 B1 | 5/2001 | Strommer |
| 6,246,231 B1 | 6/2001 | Ashe |
| 6,246,898 B1 | 6/2001 | Vesely |
| 6,248,074 B1 | 6/2001 | Ohno |
| 6,263,230 B1 | 7/2001 | Haynor |
| 6,266,551 B1 | 7/2001 | Osadchy |
| 6,310,532 B1 | 10/2001 | Santa Cruz |
| 6,361,499 B1 | 3/2002 | Bates |
| 6,368,280 B1 | 4/2002 | Cermak |
| 6,379,307 B1 | 4/2002 | Filly |
| 6,427,079 B1 | 7/2002 | Schneider |
| 6,438,401 B1 | 8/2002 | Cheng |
| 6,528,991 B2 | 3/2003 | Ashe |
| 6,542,766 B2 | 4/2003 | Hall |
| 6,546,279 B1 | 4/2003 | Bova |
| 6,587,709 B2 | 7/2003 | Solf |
| 6,626,832 B1 | 9/2003 | Paltieli |
| 6,669,635 B2 | 12/2003 | Kessman |
| 6,678,552 B2 | 1/2004 | Pearlman |
| 6,690,159 B2 | 2/2004 | Burreson et al. |
| 6,690,963 B2 | 2/2004 | Ben-Haim |
| 6,716,166 B2 | 4/2004 | Govari |
| 6,733,458 B1 | 5/2004 | Steins et al. |
| 6,754,596 B2 | 6/2004 | Ashe |
| 6,774,624 B2 | 8/2004 | Anderson |
| 6,784,660 B2 | 8/2004 | Ashe |
| 6,785,571 B2 | 8/2004 | Glossop |
| 6,788,967 B2 | 9/2004 | Ben-Haim |
| 6,813,512 B2 | 11/2004 | Aldefeld |
| 6,834,201 B2 | 12/2004 | Gillies |
| 6,856,823 B2 | 2/2005 | Ashe |
| 6,895,267 B2 | 5/2005 | Panescu |
| 6,954,128 B2 | 10/2005 | Humphries |
| 6,980,921 B2 | 12/2005 | Anderson |
| 7,020,512 B2 | 3/2006 | Ritter |
| 7,048,745 B2 | 5/2006 | Tierney |
| 7,090,639 B2 | 8/2006 | Govari |
| 7,197,354 B2 | 3/2007 | Sobe |
| 7,215,990 B2 | 5/2007 | Feussner |
| 7,274,325 B2 | 9/2007 | Fattah |
| 7,275,008 B2 | 9/2007 | Plyvänäinen |
| 7,324,915 B2 | 1/2008 | Altmann |
| 7,351,205 B2 | 4/2008 | Szczech |
| 7,373,271 B1 | 5/2008 | Schneider |
| 7,386,339 B2 | 6/2008 | Strommer |
| 7,471,202 B2 | 12/2008 | Anderson |
| 7,505,810 B2 | 3/2009 | Harlev |
| 7,517,318 B2 | 4/2009 | Altmann |
| 7,524,320 B2 | 4/2009 | Tierney |
| 7,551,953 B2 | 6/2009 | Lardo |
| 7,555,330 B2 | 6/2009 | Gilboa |
| 7,558,616 B2 | 7/2009 | Govari |
| 7,561,051 B1 | 7/2009 | Kynor |
| 7,573,258 B2 | 8/2009 | Anderson |
| 7,588,541 B2 | 9/2009 | Floyd |
| 7,603,155 B2 | 10/2009 | Jensen |
| 7,603,160 B2 | 10/2009 | Suzuki |
| 7,610,078 B2 | 10/2009 | Willis |
| 7,618,374 B2 | 11/2009 | Barnes |
| 7,636,595 B2 | 12/2009 | Marquart |
| 7,652,259 B2 | 1/2010 | Kimchy |
| 7,657,298 B2 | 2/2010 | Moctezuma de la Barrera |
| 7,660,623 B2 | 2/2010 | Hunter |
| 7,668,583 B2 | 2/2010 | Fegert |
| 7,671,887 B2 | 3/2010 | Pescatore |
| 7,697,973 B2 | 4/2010 | Strommer |
| 7,706,860 B2 | 4/2010 | McGee |
| 7,722,565 B2 | 5/2010 | Wood |
| 7,749,168 B2 | 7/2010 | Maschke |
| 7,769,427 B2 | 8/2010 | Shachar |
| 7,797,032 B2 | 9/2010 | Martinelli |
| 7,809,421 B1 | 10/2010 | Govari |
| 7,819,810 B2 | 10/2010 | Stringer |
| 7,822,464 B2 | 10/2010 | Maschke |
| 7,831,096 B2 | 11/2010 | Williamson, Jr. |
| 7,835,785 B2 | 11/2010 | Scully |
| 7,840,251 B2 | 11/2010 | Glossop |
| 7,840,253 B2 | 11/2010 | Tremblay |
| 7,840,256 B2 | 11/2010 | Lakin |
| 7,873,401 B2 | 1/2011 | Shachar |
| 7,881,769 B2 | 2/2011 | Sobe |
| 7,907,989 B2 | 3/2011 | Borgert |
| 7,909,815 B2 | 3/2011 | Whitmore, III |
| 7,926,776 B2 | 4/2011 | Cermak |
| 7,945,309 B2 | 5/2011 | Govari |
| 7,962,196 B2 | 6/2011 | Tuma |
| 7,966,057 B2 | 6/2011 | Macaulay |
| 7,971,341 B2 | 7/2011 | Dukesherer |
| 7,974,680 B2 | 7/2011 | Govari |
| 7,996,059 B2 | 8/2011 | Porath |
| 8,023,712 B2 | 9/2011 | Ikuma |
| 8,027,714 B2 | 9/2011 | Shachar |
| 8,041,411 B2 | 10/2011 | Camus |
| 8,041,412 B2 | 10/2011 | Glossop |
| 8,041,413 B2 | 10/2011 | Barbagli |
| 8,049,503 B2 | 11/2011 | Kimura |
| 8,060,184 B2 | 11/2011 | Hastings |
| 8,064,985 B2 | 11/2011 | Peterson |
| 8,068,897 B1 | 11/2011 | Gazdzinski |
| 8,073,529 B2 | 12/2011 | Cermak |
| 8,082,022 B2 | 12/2011 | Moctezuma De La Barrera |
| 8,086,298 B2 | 12/2011 | Whitmore, III |
| 8,088,070 B2 | 1/2012 | Pelissier |
| 8,090,168 B2 | 1/2012 | Washburn |
| 8,106,905 B2 | 1/2012 | Markowitz |
| 8,147,408 B2 | 4/2012 | Bunce |
| 8,162,821 B2 | 4/2012 | Kawano |
| 8,175,680 B2 | 5/2012 | Panescu |
| 8,216,149 B2 | 7/2012 | Oonuki et al. |
| 8,226,562 B2 | 7/2012 | Pelissier |
| 8,228,028 B2 | 7/2012 | Schneider |
| 8,506,493 B2 | 8/2013 | Ostrovsky |
| 2003/0036695 A1 | 2/2003 | Govari |
| 2004/0047044 A1 | 3/2004 | Dalton |
| 2004/0051610 A1 | 3/2004 | Sajan |
| 2004/0106869 A1 | 6/2004 | Tepper |
| 2004/0147920 A1 | 7/2004 | Keidar |
| 2004/0171934 A1 | 9/2004 | Khan |
| 2005/0020919 A1 | 1/2005 | Stringer |
| 2005/0033315 A1 | 2/2005 | Hankins |
| 2005/0101876 A1 | 5/2005 | Pearlman |
| 2005/0107870 A1 | 5/2005 | Wang |
| 2005/0143648 A1 | 6/2005 | Minai |
| 2005/0197569 A1 | 9/2005 | McCombs |
| 2006/0061354 A1 | 3/2006 | Wallance |
| 2006/0072843 A1 | 4/2006 | Johnston |
| 2006/0241397 A1 | 10/2006 | Govari |
| 2006/0253107 A1 | 11/2006 | Hashimshony |
| 2007/0016013 A1 | 1/2007 | Camus |
| 2007/0027390 A1 | 2/2007 | Maschke |
| 2007/0055468 A1 | 3/2007 | Plyvänäinen |
| 2007/0163367 A1 | 7/2007 | Sherman |
| 2007/0167801 A1 | 7/2007 | Webler |
| 2007/0185398 A1 | 8/2007 | Kimura |
| 2007/0276240 A1 | 11/2007 | Rosner |
| 2008/0033286 A1 | 2/2008 | Whitmore |
| 2008/0036580 A1* | 2/2008 | Breed ............... B60R 21/01536 340/438 |
| 2008/0071172 A1 | 3/2008 | Bruck |
| 2008/0094057 A1 | 4/2008 | Ashe |
| 2008/0134727 A1 | 6/2008 | May |
| 2008/0146939 A1 | 6/2008 | McMorrow |
| 2008/0183071 A1 | 7/2008 | Strommer |
| 2008/0249395 A1 | 10/2008 | Shachar |
| 2008/0262338 A1 | 10/2008 | Paitel |

(56) References Cited

U.S. PATENT DOCUMENTS

| | | |
|---|---|---|
| 2009/0070063 A1* | 3/2009 | Edelstein ............... G01V 3/081 702/150 |
| 2009/0105581 A1 | 4/2009 | Widenhorn |
| 2009/0105584 A1 | 4/2009 | Jones |
| 2009/0105779 A1 | 4/2009 | Moore |
| 2009/0156926 A1 | 6/2009 | Messerly |
| 2009/0228019 A1 | 9/2009 | Gross |
| 2009/0275833 A1 | 11/2009 | Ikeda |
| 2009/0287443 A1 | 11/2009 | Jascob |
| 2009/0299142 A1 | 12/2009 | Uchiyama |
| 2009/0299176 A1 | 12/2009 | Gleich |
| 2009/0312629 A1 | 12/2009 | Razzaque |
| 2009/0322323 A1 | 12/2009 | Brazdeikis |
| 2009/0326323 A1 | 12/2009 | Uchiyama |
| 2010/0049033 A1 | 2/2010 | Kawano |
| 2010/0049050 A1 | 2/2010 | Pelissier |
| 2010/0079158 A1 | 4/2010 | Bar-Tal |
| 2010/0121189 A1 | 5/2010 | Ma |
| 2010/0121190 A1 | 5/2010 | Pagoulatos |
| 2010/0137705 A1 | 6/2010 | Jensen |
| 2010/0156399 A1 | 6/2010 | Chiba |
| 2010/0174176 A1 | 7/2010 | Nagel |
| 2010/0191101 A1 | 7/2010 | Lichtenstein |
| 2010/0249576 A1 | 9/2010 | Askarinya et al. |
| 2010/0268072 A1 | 10/2010 | Hall |
| 2010/0312113 A1 | 12/2010 | Ogasawara |
| 2011/0021903 A1 | 1/2011 | Strommer |
| 2011/0028848 A1 | 2/2011 | Shaquer |
| 2011/0034806 A1 | 2/2011 | Hartov |
| 2011/0054293 A1 | 3/2011 | Markowitz |
| 2011/0060185 A1 | 3/2011 | Ikuma |
| 2011/0081063 A1 | 4/2011 | Leroy |
| 2011/0082366 A1 | 4/2011 | Scully |
| 2011/0118590 A1 | 5/2011 | Zhang |
| 2011/0137152 A1 | 6/2011 | Li |
| 2011/0137156 A1 | 6/2011 | Razzaque |
| 2011/0144476 A1 | 6/2011 | Jolesz |
| 2011/0144524 A1 | 6/2011 | Fish |
| 2011/0184690 A1 | 7/2011 | Iida |
| 2011/0224537 A1 | 9/2011 | Brunner |
| 2011/0230757 A1 | 9/2011 | Elgort |
| 2011/0237945 A1 | 9/2011 | Foroughi |
| 2011/0251607 A1 | 10/2011 | Kruecker |
| 2011/0282188 A1 | 11/2011 | Burnside |
| 2011/0295108 A1 | 12/2011 | Cox |
| 2011/0295110 A1 | 12/2011 | Manzke |
| 2012/0016316 A1 | 1/2012 | Zhuang |
| 2012/0071752 A1 | 3/2012 | Sewell |
| 2012/0108950 A1 | 5/2012 | He |
| 2012/0123243 A1 | 5/2012 | Hastings |
| 2012/0130229 A1 | 5/2012 | Zellers |
| 2012/0130230 A1 | 5/2012 | Eichler |
| 2012/0136251 A1 | 5/2012 | Kim |
| 2012/0143055 A1 | 6/2012 | Ng |
| 2012/0150022 A1 | 6/2012 | Bar-Tal |
| 2012/0197108 A1 | 8/2012 | Hartmann |
| 2012/0232380 A1 | 9/2012 | Pelissier |
| 2012/0259209 A1 | 10/2012 | Harhen |
| 2013/0225986 A1 | 8/2013 | Eggers |
| 2013/0296691 A1 | 11/2013 | Ashe |
| 2014/0002063 A1 | 1/2014 | Ashe |
| 2014/0046261 A1 | 2/2014 | Newman |
| 2014/0058221 A1 | 2/2014 | Old |
| 2014/0107475 A1 | 4/2014 | Cox |
| 2014/0228670 A1 | 8/2014 | Justis |
| 2014/0253270 A1 | 9/2014 | Nicholls |
| 2014/0257080 A1 | 9/2014 | Dunbar |
| 2014/0257104 A1 | 9/2014 | Dunbar |
| 2015/0080710 A1 | 3/2015 | Henkel |
| 2015/0359991 A1 | 12/2015 | Dunbar |

FOREIGN PATENT DOCUMENTS

| | | |
|---|---|---|
| CA | 2 647 432 A1 | 10/2007 |
| CA | 2 659 586 A1 | 12/2007 |
| DE | 10 2008 013 A1 | 9/2009 |
| DE | 10 2010 046 948 A1 | 12/2011 |
| EP | 0 488 987 A1 | 6/1992 |
| EP | 0 747 016 A1 | 12/1996 |
| EP | 0 928 976 A2 | 7/1999 |
| EP | 1 212 001 A2 | 6/2002 |
| EP | 1 377 335 A2 | 1/2004 |
| EP | 1 504 713 A1 | 2/2005 |
| EP | 1 715 788 A2 | 11/2006 |
| EP | 1 727 478 A | 12/2006 |
| EP | 1 804 079 A2 | 7/2007 |
| EP | 1 898 775 A2 | 3/2008 |
| EP | 1 913 875 A1 | 4/2008 |
| GB | 2 445 669 A | 7/2008 |
| GB | 2 445 699 A | 7/2008 |
| JP | 2005-312577 A | 11/2005 |
| WO | 96/05768 A1 | 2/1996 |
| WO | 00/63658 A2 | 10/2000 |
| WO | 02/00093 A2 | 1/2002 |
| WO | 2006/078677 A2 | 7/2006 |
| WO | 2006/078678 A2 | 7/2006 |
| WO | 2006/124192 A2 | 11/2006 |
| WO | 2007/025081 A2 | 3/2007 |
| WO | 2008/035271 A2 | 3/2008 |
| WO | 2008/086832 A1 | 7/2008 |
| WO | 2009/070616 A2 | 6/2009 |
| WO | 2009/089280 A1 | 7/2009 |
| WO | 2010/111435 A1 | 9/2010 |
| WO | 2010/132985 A1 | 11/2010 |
| WO | 2011/043874 A1 | 4/2011 |
| WO | 2011/043875 A1 | 4/2011 |
| WO | 2011/044273 A2 | 4/2011 |
| WO | 2011/085034 A1 | 7/2011 |
| WO | 2011/095924 A1 | 8/2011 |
| WO | 2011/098926 A1 | 8/2011 |
| WO | 2011/109249 A1 | 9/2011 |
| WO | 2011/114259 A1 | 9/2011 |
| WO | 2011/123661 A1 | 10/2011 |
| WO | 2011/127191 A1 | 10/2011 |
| WO | 2011150376 A1 | 12/2011 |
| WO | 2012/025854 A1 | 3/2012 |
| WO | 2012040077 A1 | 3/2012 |
| WO | 2012/098483 A1 | 7/2012 |
| WO | 2013034175 A1 | 3/2013 |
| WO | 2014/135592 A1 | 9/2014 |

OTHER PUBLICATIONS

Stolowitz Ford Cowger LLP, Listing of Related Cases (Updated); Portland, OR; Sep. 17, 2014; 1 page.

Placidi, Giuseppe, et al.; "Review on Patents about Magnetic Localisation Systems for in vito Catheterizations"; INFM c/o Department of Health Sciences, University of L'Aquila, Via Vetoio Coppito 2, 67100 L'Aquila, Italy; Recent Patents on Biomedical Engineering 2009, 2, 58-64; 8 pages.

Dorveaux et al., "On-the-field Calibration of an Array of Sensors", 2010 American Control Conference, Jun. 30-Jul. 2, 2010, Baltimore, Md, USA, 8 pages.

European Patent Office, "Internaional Search Report" for PCT/EP2011/065420, mailed Aug. 20, 2012, 5 pages.

Stolowitz Ford Cowger LLP, "Listing of Related Cases", Feb. 5, 2014, 2 pages.

\* cited by examiner

MAGNETIC POSITION DETECTION SYSTEM

TECHNICAL FIELD

The present invention relates to a magnetic position detection system and, in particular, to compensating in such a system for the effect of stray magnetic fields.

BACKGROUND AND OVERVIEW

Unless explicitly indicated herein, the materials described in this section are not admitted to be prior art.

There are many different position detection systems used in many fields of technology to detect the position of a target object in a particular frame of reference. One particular class is magnetic position detection systems in type of which a target object is either magnetised or carries magnets whose field is detected by one or more magnetometric sensors. The detected field varies with the position of the target object relative to the sensors and so the position of the target object can be detected. An example of an industrial use of such a system is found in U.S. Pat. No. 6,690,159 in which a target device incorporates a magnet, and a linear sensing device incorporating an array of Hall effect sensors is provided which have outputs that vary as a function of the strength of the magnetic field induced by the magnet in the target device. This can be used, for example, in a vehicular wheel speed sensing system, in detecting the position of internal components of a machine or in the detecting of the attitude of one part of a machine relative to another. Magnetic position detection has also been proposed for use in the medical field. For example U.S. Pat. No. 8,216,149 and WO-A-2012/040077 disclose the use of magnetic position detection to detect the movement of a needle within a needle guide attached to an ultrasound imaging probe.

In all magnetic positioning detection systems the accuracy of the system is dependent upon the output of the magnetometric sensors varying only with the change in position of the tracked object and not being corrupted by the effect of varying stray magnetic fields from other sources. In some systems the effect of stray fields can be avoided by ensuring that stray fields are much smaller than the field from the target object, for example by shielding the detection space of the position detection system and/or by ensuring that the magnetic field from the target object is relatively high, for example by using a high magnetisation or having the target object and magnetometric sensors in close proximity. Also if the magnetometric detectors are in a fixed position and the magnetic field is not time varying, the effect of stray fields can be eliminated by simply measuring the magnetic fields in the absence of the target object, and subtracting these values from the subsequent measurements when the target object is present.

More recently, however, magnetic position detection has been proposed for use in more challenging applications. For example, in the field of ultrasound image guided surgical procedures in which a tissue penetrating medical tool or instrument such as a hypodermic needle, cannula, catheter or the like is inserted into the patient while ultrasound imaging a target anatomical region within the patient, it has been proposed to enhance the tracking of the medical tool by magnetising it and detecting its position relative to the ultrasound probe by means of a magnetometric detector attached to the ultrasound probe. Such a system is described in our co-pending International (PCT) patent application PCT/EP2011/065420. In this system the tissue penetrating medical tool, e.g. the needle, is magnetised and an array of magnetometers on the freehand ultrasound probe detect the magnetic field from the needle and, of course, a background which is mainly the terrestrial magnetic field. The position of the needle relative to the magnetometric detectors, and thus the ultrasound probe, is calculated by modelling the combination of the terrestrial magnetic field and the needle's magnetic field and fitting the model to the magnetometric sensor measurements. This gives the position of the needle relative to the probe and this magnetically detected position can then be displayed superimposed on the ultrasound image display of the patient's anatomy. Advantages of this system include the fact that the ultrasound probe is a freehand probe which can thus be freely manipulated by the operator to image the target anatomy in the best way, and that the target object, for example the needle, is a standard one which has been magnetised. This means that the familiarity and experience with which the user has built up with handling such standard tools is preserved. Such experience and familiarity is important with invasive procedures, such as regional anaesthesia, vascular access, fine needle aspiration, musculoskeletal injections and so on in which the operator often relies on tactile feedback ("feel") to guide the procedure, for instance to know when the desired target anatomy is reached by the needle.

However these features lead to disadvantages in trying to cope with the effects of stray magnetic fields. The fact that the magnetometric detectors are not fixed in position means that spatial variation in the background magnetic field will affect the measurements. Further, the magnetic field from the target object may be weak, meaning that stray magnetic fields tend to have a greater influence.

Although it would be possible to eliminate the effect of background magnetic fields by measuring them and subtracting them, simple and practical ways of doing this are not easy to find.

It would be therefore be desirable to provide a magnetic position detection system with a way of automatically detecting whether or not the target object is present, which would allow accurate zeroing. It is also desirable to provide for automatic zeroing on the basis of such a determination and preferably to allow an indication to be given to the user the degree of confidence in the position detection.

The present invention provides a magnetic position detection system comprising: a magnetic target object, an array of magnetometric sensors for detecting the magnetic field from the target object in a detection space, and a data processor for receiving magnetic field measurements from the array of magnetometric sensors and calculating the position of the target object relative to the array, the data processor being adapted to detect whether or not the target object is present in the detection space by: fitting a magnetic field model to the magnetic field measurements by minimising differences between the magnetic field model and the magnetic field measurements, determining remaining differences between the fitted magnetic field model and the magnetic field measurements, and determining from the remaining differences whether or not the target object is present in the detection space.

The sensors may be calibrated to provide calibrated values as said measurements. Optionally the average magnetic field measured by the sensors, or a subset of them, may be subtracted from the measurements, and the model fitted to the resulting deviations from the average. The terminology "magnetic field measurement" used herein may be therefore the calibrated measurements from calibrated sensors or deviations of them from the average field obtained by calculation.

Preferably the target object is rendered magnetic by carrying one or more permanent magnets or by at least part of it being permanently magnetised itself. Alternatively the target object could be magnetised from outside by induction.

The invention is particularly applicable to a position detection system in which the target object is a tissue-penetrating medical or surgical tool or instrument such as a needle, cannula, catheter or stylet. The system may be used in an ultrasound image guided procedure by having the magnetometric sensors attached to a freehand ultrasound probe of an ultrasound imaging system. Preferably the magnetically detected position of the target object is then displayed on the image display of the ultrasound image system. Preferably the position of the target object relative to the array of magnetometric sensors is determined by modelling the magnetic field from the target object, optionally with a background magnetic field comprising the terrestrial magnetic field. The modelled background magnetic field may comprise magnetic field influences from other magnetic objects.

The magnetic field from the target object may be modelled as plural spaced monopoles and a model is preferably a parametric model including as a parameter the position of the target object relative to the magnetometric sensors.

Preferably the step of determining whether or not the target object is present in the detection space comprises comparing the remaining differences after model fitting to the magnetic field measurements themselves. For example the sum of the absolute differences or squared differences, or the ratio of these quantities to the mean of the magnetic field measurements (or their squares), optionally normalised to the number of field measurements, may be calculated and compared to a threshold. If the differences after model fitting are high compared to the magnetic field measurements then it suggests the measurements are not accurately fitting the model, which in turn suggests that the target object (whose field the model represents) is not present. On the other hand if the differences are low compared to the measurements, it suggests that the model is accurately fitting the measurements suggesting that the target object is present. Thus the comparison of the differences between the fitted magnetic field model and the magnetic field measurements provides a metric which indicates whether or not the target object is present.

Preferably detection of a target object is confirmed (or not) by also examining whether other parameter values returned by the model are realistic, e.g. whether the length of the target object is within a tolerance, e.g. 50%, or more preferably 20-25%, of the actual target object length, whether the distance between the target object and the sensor array is more than a preset amount—e.g. 120 mm, whether the magnetisation is within a preset tolerance, e.g. a factor of two, of what is expected. Also whether the residual is below a preset threshold and whether the model fitting process takes less than a preset time can be used to conform whether or not a target object is present. These are supervisory checks which can be used individually or in combination.

This metric for determining whether or not the target object is present can be utilised in a position detection system to provide for reliable automatic zeroing. This is because an accurate and robust determination that the target object is not present allows the magnetic field measurements from the magnetometric sensors to be taken as accurately representing the background field (including any stray magnetic field, in the detection space). Such background measurements can be stored and then used in the position sensing process for the target object. In the position sensing process the magnetic field measurements from the magnetometric sensors can be corrected by removing from them the influence of the stored background measurements and then a model of the magnetic field from the target object can be fitted to the corrected measurements.

Preferably the target object position sensing process is conducted more frequently than the background field measurement process. Thus, for example, several successive cycles of target object position sensing can use the same stored background measurements. The background measurements will preferably only be updated upon determination that the target object is no longer in the detection space.

Another aspect of the invention provides an indication to the user on whether stray magnetic fields are present in the detection space by calculating the spread of the background magnetic field. This gives an indication of the confidence in the accuracy of the magnetic position detection. If the spread is low, the stray fields are not present or small enough to be ignored. If larger, then the user can be advised by an indicator to hold the probe steady. If still larger then the user can be advised that the magnetic position detection is not confident. The spread can be the standard deviation or some other measure of spread such as the average over the magnetic field sensors of the deviation of their values from the mean background field Thus in more detail this aspect of the invention provides a magnetic position detection system comprising: a magnetic target object, an array of magnetometric sensors for detecting the magnetic field from the target object in a detection space, and a data processor for receiving magnetic field measurements from the array of magnetometric sensors and calculating the position of the target object relative to the array by fitting a model of the magnetic field from the target object to the magnetic field measurements, the data processor being adapted to calculate an indicator of the confidence in the calculated position by: measuring the magnetic field in the detection space in the absence of the target object to obtain a set of magnetic field measurements; calculating the spread of the magnetic field measurements, and displaying to a user an indicator based on the spread to indicate the confidence in the calculated position.

The spread may be the standard deviation of the amplitude of the magnetic field measurements, or another statistical measure of spread, e.g. the average deviation from the mean, and the data processor may be adapted to compare the spread of the measurements to two predetermined thresholds to indicate three conditions, or the indicator may give a more continuous indication of spread and thus confidence.

The data processor may adapted to detect whether or not the target object is present in the detection space as explained above. Thus the different aspects of the invention are advantageously combined together in a single system, though each of them may be used separately. For example the background field can be measured in a different way and used to generate a stray field indicator, or the absence of the target object can be determined in a different way in the generation of the stray field indicator.

The invention also extends to an ultrasound imaging system comprising a magnetic position detection system as explained above.

The invention also provides a corresponding method of determining whether or not a target object is present in the detection space of a magnetic detection system, a corresponding zeroing method to eliminate the effects of stray magnetic fields, and a corresponding method of indicating to a user the confidence in the magnetically-detected position.

BRIEF DESCRIPTION OF THE DRAWINGS

The invention will be further described by way of examples with reference to the accompanying drawings in which.

DETAILED DESCRIPTION

Figure 1:
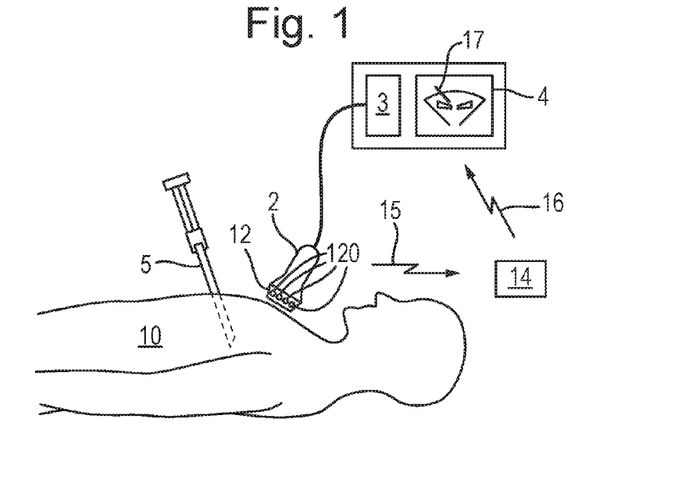
FIG. 1 illustrates an ultrasound image guided surgical procedure including magnetic position detection in which an embodiment of the present invention can be applied.

As shown in FIG. 1 the system in this embodiment of the invention comprises an ultrasound imaging system 1 including an ultrasound transducer 2, system processor 3 and display 4. The system also comprises a tissue-penetrating medical or surgical tool 5 such as a needle, catheter, stylet or cannula.

To allow reliable and accurate detection of the position in the subject's body 10 of the tool 5, the tool is magnetised and the ultrasound transducer 2 is provided with a magnetometric detector 12 comprising an array of magnetometers 112. The detector 12 senses the magnetic field from the tool 5, together with the terrestrial magnetic field and any other background magnetic field, and the processor 3 is adapted to determine from the detected field the position and orientation of the tool 5 relative to the transducer 2. This magnetically detected position is then displayed on the display 4 together with the ultrasound image.

The ultrasound system 1 can be a standard two dimensional B-mode ultrasound system with the standard ultrasound probe 2 being modified by the provision of the magnetometric detector 12. The processor 4, which is connected to the ultrasound probe 2 via a cable, drives the ultrasound transducer 2 by sending electrical signals to cause it to generate ultrasound pulses and interpreting the raw data received from the transducer 2, which represents echoes from the subject's body 10, to assemble it into an image of the patient's tissue. The magnetometric detector 12 may be detachably attached to the ultrasound transducer 2 and can be battery-powered or powered from the ultrasound system. Preferably positioning elements are provided on the magnetometric detector 12 to ensure that it is always attached in the same well-defined position and orientation. The magnetometric detector 12 is connected by a wireless connection 15 to a base unit 14 which is in wireless or wired (e.g. USB) communication 16 with the ultrasound system processor 3 and display 4. The base unit 14 can be integrated with, or some of its functions performed by, the ultrasound system processor 3 or the magnetometric detector 12. As will be explained in more detail below, the base unit 14 receives normalised measurements from magnetometric detector 12 and calculates the position, or optionally the position and orientation, of the medical tool 5. The base unit 14 can also receive additional information such as the state of charge of the magnetometric detector's battery and information can be sent from the base unit 14 to the magnetometric detector 12, such as configuration information. The base unit 14 forwards the results of its calculations, i.e. the position and, optionally, orientation, of the tool 5 to the ultrasound image processor 3 for inclusion in the displayed ultrasound image of an image 17 of the tool 5. This will be explained in more detail below.

The magnetometric detector 12 and the way in which the position of the magnetised tool 5 compared to the ultrasound probe 2 are calculated will now be explained in more detail. Similar techniques are described in our co-pending International (PCT) patent application PCT/EP2011/065420.

Figure 2:
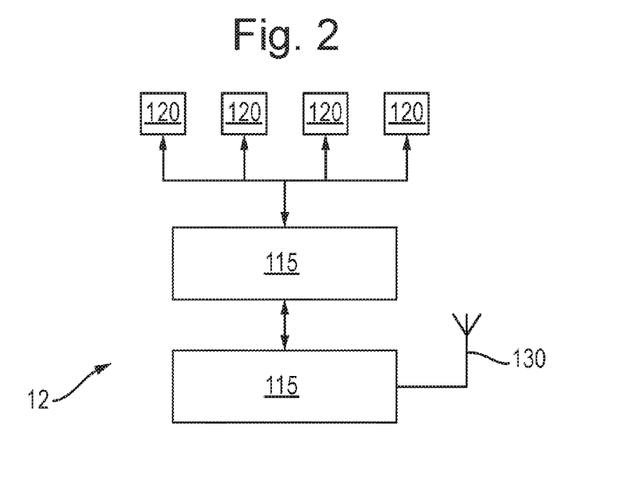
FIG. 2 is a block diagram illustrating the parts of the magnetometric detector of a the system of FIG. 1.

The components of the magnetometric detector 12 are shown schematically in greater detail in the block diagram of FIG. 2. The magnetometric detector 12 comprises an array 100 or two or more (e.g. four) magnetometers 120 (not shown in FIG. 2) whose outputs are sampled by a microprocessor 110. The microprocessor 110 converts the measurement results obtained from the magnetometer array 100 to calibrated values as discussed in more detail below and forwards them to a transceiver 115 with an antenna 130 which, in turn transmits the information to the base unit 14. In a modified version of this embodiment, the magnetometric detector 12 is provided with a multiplexer rather than with a microprocessor 110 and the normalization is performed by a processor 180 in the base unit 14.

Each magnetometer 120 in the array 100 of magnetometers measures the components ($a_k^u$, $a_k^v$, $a_k^w$) (k indicating the respective magnetometer) of the magnetic field at the position of the respective magnetometer 120 in three linearly independent directions. The microprocessor 110 transforms these raw values:

$$a_k = (a_k^u, a_k^v, a_k^w)$$

into corresponding calibrated values:

$$b_k(b_k^x, b_k^y, b_k^z)$$

in predetermined orthogonal directions of equal gain by multiplying the three values $a_k$ obtained from the magnetometer with a calibration matrix $M_k$ and adding a calibration offset vector $\beta_k$:

$$b_k = a_k * M_k + \beta_k$$

as will be described in more detail below. The calibration matrices and the calibration offset vectors are permanently stored in a memory associated with the microcontroller. This same transformation is performed for each of the magnetometers 120 with their respective calibration matrix and adding a calibration offset vector such that the result $b_k$, for each magnetometer provides the components of the magnetic field in the same orthogonal spatial directions with identical gain. Thus, in a homogenous magnetic field, all magnetometers always provide identical values after calibration regardless of the strength or orientation of the homogenous magnetic field.

Calibration and Offset

All magnetometers should measure equal values when exposed to a homogeneous field. For example, a magnetometer rotated in the homogeneous terrestrial magnetic field should, depending on the orientation of the magnetometer, measure varying strengths of the components of the magnetic field in the three linearly independent directions x, y, z. The total strength of the field, however, should remain constant regardless of the magnetometer's orientation. Yet, in magnetometers available on the market, gains and offsets differ in each of the three directions. Moreover, the directions often are not orthogonal to each other. As described, for example, in U.S. Pat. No. 7,275,008 B2, for a single sensor, if a magnetometer is rotated in a homogeneous and constant magnetic field, the measurements will yield a tilted 3-dimensional ellipsoid. Because the measured field is constant, however, the calibrated measurements should lie on a sphere. Preferably, an offset value β and a gain matrix M are introduced to transform the ellipsoid into a sphere.

With a set of sensors, additional steps need to be taken to assure that the measurements of different sensors are identical with each other. To correct this, preferably, set of a gain calibration matrices $M_k$ and calibration offset vectors $β_k$ for each position k are determined which transform the magnetometer's raw results $a_k$ into a calibrated result $b_k$:

$$b_k = a_k * M_k + β_k$$

Such a set of gain matrices $M_k$ and offset vectors $β_k$ can be obtained by known procedures, for example the iterative calibration scheme described in Dorveaux et. al., "On-the-field Calibration of an Array of Sensors", 2010 American Control Conference, Baltimore 2010.

By virtue of the defined transformation, $b_k$ provides the strength of the component of the magnetic field in three orthogonal spatial directions with equal gain. Moreover, it is ensured that these directions are the same for all magnetometers in the magnetometric detector. As a result, in any homogeneous magnetic field, all magnetometers yield essentially identical values.

The calibration information $M_k$ and $β_k$ for each magnetometer as obtained in the calibration step can be stored either in the magnetometric detector 12 itself or in the base unit 14. Storing the information in the magnetometric detector 12 is preferred as this allows easy exchange of the magnetometric detector 12 without the need to update the information in the base unit. Thus, in a preferred embodiment of the invention, the outputs of the magnetometers of the magnetometric device are sampled and their results are calibrated in the magnetometric detector 12. This information, together with any other relevant information, is transmitted to the base unit 14 for further analysis.

In another embodiment of the invention, the transformation can be another, more general non-linear transformation $b_k = F(a_k)$ to counteract any sensor non-linearities or provide compensation, e.g. for temperature variations.

In addition to the above calibration method, another calibration method is applied which employs an inhomogeneous magnetic field to obtain the relative spatial locations of the magnetometric detector's magnetometers. While standard calibration methods utilize a homogenous magnetic field to (a) align the measurement axis of the magnetometers orthogonally, (b) cancel the offset values and (c) adjust to equal gain, it is of further advantage that also the precise relative spatial locations of the magnetometers are available. This can be achieved by an additional calibration step in which the magnetometric detector is subjected to a known inhomogeneous magnetic field. Preferably, comparing the obtained measurements at the various positions to the expected field strengths and/or orientations in the assumed locations, and correcting the assumed locations until real measurements and expected measurements are in agreement, allows for the exact calibration of the spatial positions of the sensors.

In a variation of the latter calibration method, an unknown rather than a known homogeneous field is used. The magnetometers are swept through the unknown magnetic field at varying positions, with a fixed orientation. With one of the magnetometers supplying a reference track, the positions of the other magnetometers are adaptively varied in such a way that their measurements align with the measurements of the reference unit. This can be achieved for example by a feedback loop realizing a mechano-magnetic-electronic gradient-descent algorithm. The tracks used in this inhomogeneous field calibration can be composed of just a single point in space.

Model Fitting and Position Detection

Figure 3:
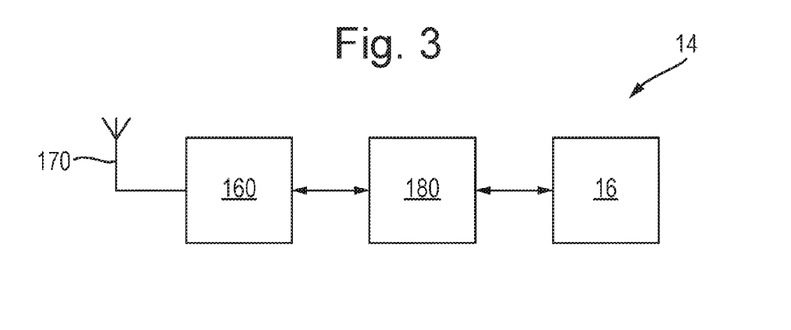
FIG. 3 is a block diagram illustrating the parts of the magnetic position detection base station of the system of FIG. 1.

The base station 14 shown schematically in greater detail in FIG. 3 receives the calibrated positional information from the magnetometric detector 12 through its receiver 160 with antenna 170 and forwards the information to a processor 180. There, the calibrated results of the measurements are combined to derive the position (or position and orientation) of the tool 5. In the absence of stray magnetic fields (or any procedure to correct for them), the values $b_k$ could be used to fit a model $c_k(p)$ of the combined magnetic field originating from the magnetic tool 5 and the terrestrial magnetic field. The unknown parameters p in this model are the tool's location relative to the ultrasound transducer 2, it's length and orientation d and it's magnetisation in as well as the terrestrial magnetic field E:

$$p = \{l, d, m, E\}$$

While it is possible to fit the model to the values $b_k$, in this embodiment the values $b_k$ are converted into what we will call "gradient" values, which are deviations from an average. To calculate the average for this purpose the mean of the sensors, or a selected subset of them, is calculated and the gradient values for each sensor (which have three orthogonal components $G_k(x)$, $G_k(y)$, $G_k(z)$ are calculated as:

$$G_k(t_i) = b_k(t_i) - \overline{b_k(t_i)}$$

The model used in this embodiment uses these gradient values. Thus the model $c_k(p)$ comprises the components $c_k^x(p)$, $c_k^y(p)$, $c_k^z(p)$ of the gradient values at the position of magnetometer k at a given set of parameters p. By means of appropriate algorithms known to the skilled person the parameters p are obtained at which the residual R, i.e. the sum of the squares of the deviation of the components of the magnetic field according to the model from the components actually measured:

$$R = \Sigma_k R_k = \Sigma_k (G_k - c_k(p))^2$$

is minimized or below a defined amount—e.g. the scaled residual which is the residual divided by the mean of the squared gradient values—is less than 3.0. Suitable minimization techniques are for example gradient-descent algorithms as well as Levenberg-Marquardt approaches. Moreover, Kalman filter techniques or similar iterative means can be utilized to continuously perform such an operation.

If the tool 5 is sufficiently rigid, i.e. it bends only slightly, it can be approximated as a straight hollow cylinder. The magnetic field of such cylinder is equivalent to that of opposite magnetic charges (i.e. displaying opposite magnetic force) evenly distributed on the end surfaces of the cylinder, i.e. two circular rings at the opposite ends of the tools, the rings having opposite magnetic charge. In view of the small diameter of the tool 5, the charges can be further approximated by two magnetic point charges (monopoles) at the opposite ends of the tool 5. Thus, according to the model, the magnetic field of a tool 5 extending along the vector d is measured from a position $r_k$ is:

$$c_k(r_k, d, m) = m * (r_k / |r_k|^3 - (r_k + d) / |r_k + d|^3).$$

Here $|r_k|$ and $|r_k+d|$ indicate the absolute values of the vectors $r_k$ and $r_k+d$, respectively. The positions $r_k$ can be converted to the location l of the tool 5 relative to the ultrasound transducer 2 with the help of the known positions of the magnetometers 120 in the magnetometric detector 12 and the position of the magnetometric detector 12 relatively to the ultrasound transducer 2.

Note that in contrast to many known approaches the above model does not assume the field of the tool to be a dipole field. This would be an oversimplification as the magnetometric detectors in general are too close to the tool as compared to its length to make a dipole field a valid approximation.

The solution obtained by non-linear optimisation can be checked to give more confidence that it represents a true tool position. For example the values returned by the fitted model for any combination of: the length of the tool compared to its expected value (e.g. within 50%), the position of the tool in the detection space—e.g. is it within a reasonable distance of the sensor, e.g. 120 mm, did the optimisation finish in a reasonable time, the magnetisation of the tool, the measures field strengths (compared to the noise level of the sensors), are the residuals acceptably low (e.g. scaled residual less than 3.0)? One or more of these, or indeed other, supervisory checks may be used with tolerances set heuristically as appropriate.

The tool position obtained by fitting the model to the measured gradient values $G_k$ as described above is then forwarded via link 16 to the processing unit 3. There, it is superimposed on the image of the tissue as obtained from the handheld ultrasound transducer 2.

If the tool 5 is in the imaging plane of the ultrasound transducer 2 it can be displayed as a solid line as illustrated schematically in FIG. 1. It is possible, however, that the tool is not in the ultrasound imaging plane. In such a case it is possible to display a position of the needle as projected onto the ultrasound image plane and to indicate in the display that it is a projected position by changing its display style. For example it can be displayed dotted and/or in a different colour. The tool is always visualised as a line, the end of which corresponds to the tool's tip. It is possible for the colour or display style to change depending upon whether the tool is in front of behind the imaging plane, and indeed if it cuts the imaging plane, parts behind can be displayed in one way and parts in front in another way.

It is also possible to display the whole expected tool track on the image display, this being a straight line extension of the tool's extent. Where anatomical features can be identified in the ultrasound image it is also possible to highlight the intersection of the tool track with these features, or to highlight the intersection of the tool's track with the ultrasound imaging plane, for example by displaying a circle or rectangle on the intersection.

Although in FIG. 1 the magnetometers 120 are displayed in an array across the front of the ultrasound transducer 2, it is also possible for them to be arranged in different ways on the ultrasound transducer 2.

Optionally the transducer 2 can also be provided with an inertial measurement unit which measures the position and orientation of the transducer by monitoring its acceleration from an initial position.

Magnetic Tool

The magnetic tool 5 is at least partly a permanent magnet, however the tool 5 may include a magnetic component which is a non-permanent magnet, e.g. an electromagnet, e.g. a solenoid to which an electric current can be applied to create the magnetic field. Alternatively the inserted part of the tool 5 may be magnetic due to magnetic induction from outside the body or from another part of the tool 5.

The magnetisation may be provided by a magnetic coating, preferably a permanent magnetic coating. For this purpose, it may for example comprise permanent magnetic particles, more preferably nanoparticles, A "nanoparticle" is a particle that in at least two spatial dimensions is equal to or smaller than 100 nm in size.

In one embodiment of the invention, tool has an essentially uniform magnetization. In another embodiment, the magnetization is non-uniform in at least one dimension, i.e. the magnetic moment varies in magnitude and/or direction as a function of the location on the tool, thereby creating a one- or more-dimensional magnetic pattern, e.g. similar to the pattern of a conventional magnetic strip (at least one-dimensional) or disk (two-dimensional) as it is used for the storage of information e.g. on credit cards. In a preferred embodiment of the invention, a one-dimensional magnetic pattern may be recorded along the length of the tool. Advantageously, such a pattern can be useful to identify the tool. Also, by marking certain parts of the tool with different magnetic codes, these parts can be distinguished. It is an achievable advantage of this embodiment of the invention that the position and/or orientation of the tool can be better determined, as individual parts of the tool can be identified and individually tracked with respect to their position and/or orientation. In particular, advantageously, a varying shape of the tool, for example a needle bending under pressure, can be tracked. Moreover, a deformed tool and/or its deformation or degree of deformation can be determined more easily.

Zeroing to Remove Stray Magnetic Fields

As discussed above it is advantageous to remove from the magnetic position sensing process the effect of stray magnetic fields. Such stray fields can arise from any magnetic object in or around the target object and which affect the resultant magnetic field in the detection space. Thus iron or steel items in a patient's body or in equipment nearby can distort the magnetic field and affect the accuracy of the position measurement. It would be possible to include in the model other known contributions and thus effectively to model them out of the process. By the term "stray magnetic field", therefore, is meant any magnetic influence which is not present in the model. The present embodiment of the invention is adapted to remove such stray fields in a zeroing process.

One option is to provide a "zeroing" button for the user to operate when the ultrasound probe is in position and the target object not present (this meaning that the sensed fields are only background). This permits a recalibration of the sensor array to remove the effect of background field including stray fields.

Another embodiment of the invention provides an autozeroing function which, in general terms, has an automatic process firstly of making a robust determination that the target object is not present, such that the sensed magnetic field can be regarded as including any stray magnetic fields which can be measured and stored, and then using the stored measurements of the stray magnetic fields to correct subsequent sensor measurements in a position detection process like that described above.

This will be exemplified in the following typical ultrasound image guided procedure:

1) Ultrasound scan of the patient anatomy using the freehand ultrasound probe.
2) Find the target anatomy for needling and hold the ultrasound probe in this position.

3) Bring the needle into the vicinity of the ultrasound probe, i.e. into the detection space.
4) Choose the needle insertion point and insert it to the target anatomy under ultrasound image guidance.

Based on these quantities a metric is then defined to indicate whether or not the target object is present in the detection space. This is the "relative residual metric" hereinafter referred to as RRM. The metric used in this embodiment is the scaled residual mentioned above calculated as:

$$RRM = \sum_k \frac{R_k}{G_k^2}$$

where $R_k$ are the residuals as defined above following model fitting subject to the additional supervisory checks mentioned above on the solution being satisfied.

Alternative ways of calculating a metric are possible, for example the absolute values of the differences between the measured values and the model, optionally divided by the mean, but the important aspect is that the residuals are compared to the measured field.

RMM($t_i$) has very low values when a target object is present in the detection space of the sensors because the model (which "expects" a target object) fits better to the data, but high values when no target object is present. Therefore comparing RMM($t_i$) to a threshold (TH1) is indicative of whether a target object is present or not.

Remembering that one of the aims of the invention is to obtain a background magnetic field measurement which can be removed from the sensor measurements. A simple auto-zeroing method could be conceived in which if the result of the RRM determination is that no target object is present, the magnetic field measured is regarded as background and then deducted from all subsequent field measurements before calculation of the RRM. However a problem with this is that if the target object enters the detection space gradually, the RRM may decrease from one time point to the next, but insufficiently to pass the threshold TH1. In that case the small field being detected from the target object would then be regarded as part of the background (because the target object is regarded as not being present), and that field will be removed in the next measurement process. Consequently the field from the target object would continuously be removed and the target object would never be determined as being present. To eliminate this problem a different approach is taken as illustrated in FIG. 4.

Figure 4:
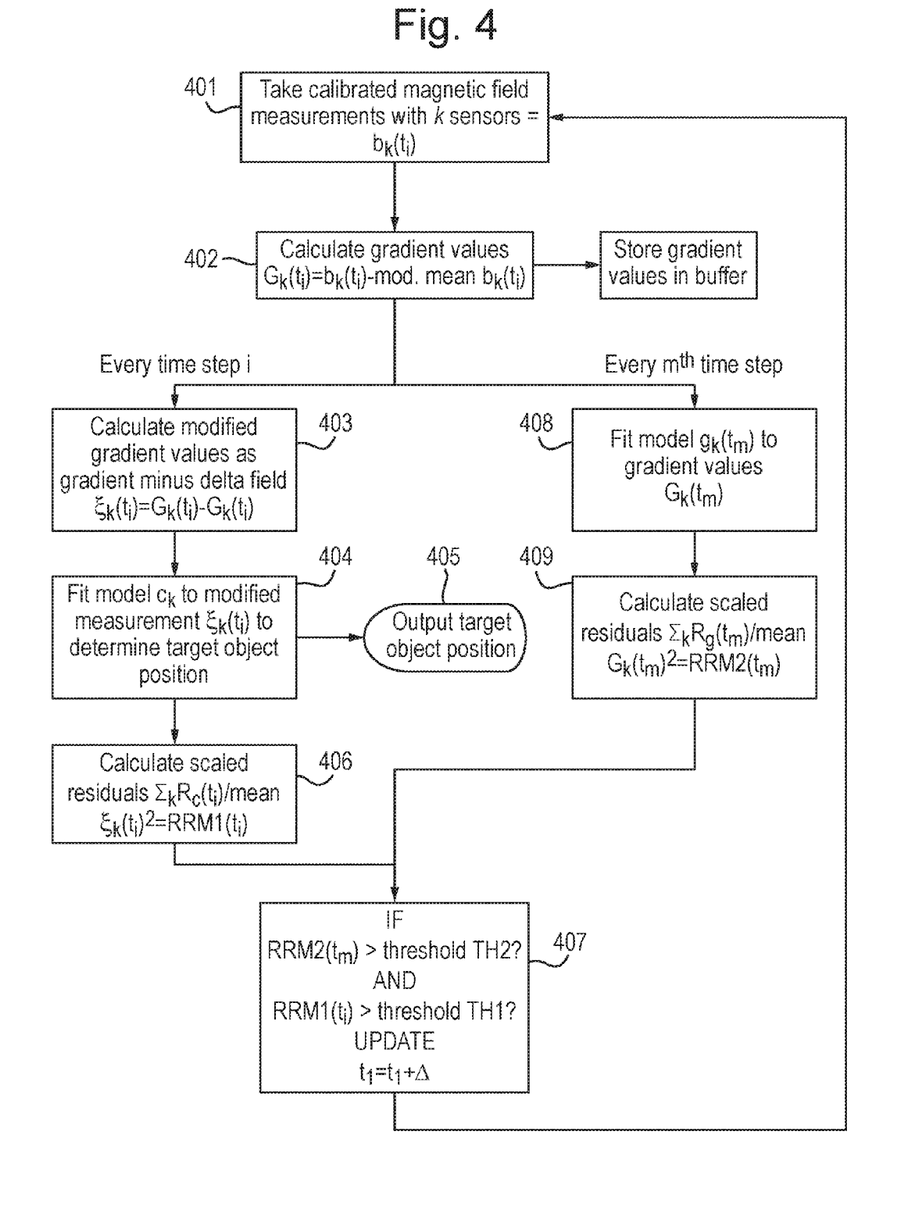
FIG. 4 is a flow diagram schematically explaining one embodiment of the present invention.

Steps 401 to 405 of FIG. 4 illustrate the fitting of the model to determine the position of the target object. In step 401 the magnetic field is measured with a number k magnetometric detectors 112 to produce a set of measurements $b_k(t_i)$ at time i where i is the time step of the measurement process. It should be noted that the measurements from each of the k sensors each comprise three orthogonal components and have the normalisation and offset matrices applied.

In step 402 the gradient values WO are calculated by subtracting the mean of the values from the modified set of sensors from each of the sensor values. These values are stored to a buffer capable of storing the values from multiple, for example at least ten, measurement cycles.

In step 403, and to eliminate the effect of stray fields, modified gradient values $\xi_k(t_i)$ are calculated by subtracting a preceding set of gradient values $G_k(t_1)$ taken at time $t_1$ and regarded as background (i.e. values obtained when the target object was not present):

$$\xi_k(t_i) = G_k(t_i) - G_k(t_1)$$

The preceding values $G_k(t_1)$ will be referred to as the delta field. Time $t_1$ is a preceding time point (i.e. 1<i) and it will only be updated periodically on condition that no target object has been detected. How the background values forming the delta field are found will be described below.

In step 404 the model $c_k$ is fitted to the modified gradient values $\xi_k(t_i)$ in the manner described above and assuming that a target object is detected (i.e. supervisory checks such as a sufficiently good model fit is obtained (e.g. residuals less than a threshold) and the checks on length and/or distance from sensor, and/or optimisation time, are satisfied) the target object position is output in step 405 to allow its display.

Then in step 406 a first relative residual metric RRM1($i$) is obtained by summing the residuals $R(t_i) = \Sigma_k [c_k(t_i) - \xi_k(t_i)]^2$ and dividing the sum by the sum of the squares of the modified gradient values $\xi_k(t_i)$ normalised to the total number of measurements (e.g. divided by three times the number of sensors for sensors giving the three orthogonal field components).

$$RRM1 = \frac{\Sigma_k [c_k(t_i) - \xi_k(t_i)]^2}{\frac{1}{N} \Sigma_k \xi_k(t_i)^2}$$

This will be used in the background detection as explained below.

FIG. 4 also illustrates in the steps 406 to 409 how the background values forming the delta field $G_k(t_1)$ are found based on a robust determination that the target object is not present. In step 408 a model $g_k$ is fitted to the gradient values $G_k(t_i)$. It should be noted that the model is being fitted to the gradient values without correction for the background (in contrast to steps 403 and 404). Further the model is preferably regarded as fitted with a wider tolerance than in step 404, for example by accepting a fit when the residuals are less than a higher threshold. Also preferably fewer, more tolerant supervisory checks are made to confirm a solution—e.g. only a tool length tolerance (e.g. within 25% of expected) or only a magnetisation tolerance (for example no more than twice the expected value). This enables the robust detection of whether or not the target object is present in the detection space. In step 409 a second Remaining Residual Metric RRM2 based on the scaled residuals from the fitted model $g_k$ is then calculated:

$$RRM2 = \frac{\Sigma_k [g_k(t_m) - G_k(t_m)]^2}{\frac{1}{N} \Sigma_k G_k(t_m)^2}$$

In step 407 the two Remaining Residual Metrics RRM1 and RRM2 are compared to respective thresholds TH1 and TH2. TH1 is preferably less than TH2, which means that TH2 is more likely to be passed first when a target object approaches. For example TH1 may be 3.0 whereas TH2 may be 8.0 but these values depend on the degree of magnetisation of the target object and the stability of the algorithm and so are set heuristically. If TH2 is too high then it would be satisfied too easily and the algorithm would tend to detect other objects which are not the target object. If it is too low then the approaching target object will not be detected soon enough. Therefore a value balancing these issues is used.

As the threshold on the residuals used in the model fitting process of step 408 is more tolerant than that in step 403, it is possible in step 408 that the processor identifies some different interfering magnetic field as indicative of a target object entering the detection space. For example if the model models an elongate target object, then some different object with a similar magnetic signature could satisfy the threshold TH2 of step 407. This would suspend the updating of the background magnetic field, even though the target object is not present. This is one reason for the inclusion of the supervisory checks in the fitting of step 408, for example comparing the calculated magnetisation of the object and/or the calculated length of the object to that expected. The tolerance for these steps can be much looser than the tolerance used in the similar checks in step 403.

Assume, therefore, that the system is starting with no target object in the detection space. In the initial cycles through the process of FIG. 4 the magnetometric sensors will measure any stray magnetic fields and load the buffer with these measurements, while until the buffer has sufficient samples the delta field used in step 403 will be zero (or optionally preset initialized values). The absence of any target objects will mean that the scaled residuals and RRM 1 and 2 are both high so both thresholds TH1 and TH2 will be exceeded.

Although it would be possible to run steps 408 and 409 at every time step i, just like steps 403 to 406, to save on processor usage and to improve the chances of detection of a slowly approaching target object, steps 408 and 409 are only run at a time step in which is a multiple of i, for example every 250 msec. The delta field used each time in step 403 are the values stored in the buffer at time $t_1$ which is set to be several times steps previous to the current one, for example 5 time steps (corresponding to 1 second). Assuming that the thresholds of step 407 are not exceeded in step 407, the time $t_1$ is updated (i.e. moved forward) every measurement cycle by a value Δ which can be a single time step equal to i, or multiple time steps.

On every $m^{th}$ time step (for example every 250 msec) steps 408 and 409 are conducted. Because the RRM2 of step 409 is calculated on the gradient values without subtraction of the delta field, it will not miss a slowly approaching target object. Furthermore, because in step 407 it is compared to a threshold TH2 which is higher than threshold TH1, threshold TH2 will normally be passed before TH1 by an approaching target object (remembering that the residuals are high when there is no target object and gradually decrease as the model fits better as the target object approaches). As soon as either one of the thresholds TH1 or TH2 is passed, and the other supervisory checks that a suitable model fit has been obtained are satisfied (length, magnetisation, time, distance as appropriate) then the updating of the time point $t_1$, which marks the stored gradient field values to be representative of background is suspended. Thus the last-used background values forming the delta field will continue to be used in step 403, as steps 401 to 407 then repeat to track the detected target object. Thus the stray fields and any other background detected before the target object entered the detection space are accurately removed.

Incidentally, the process above is also effective to compensate for drift in the calibration offsets in the magnetometric detector caused by permanent magnetisation of the probe during use as these simply combine with the background field and are eliminated in step 403.

The embodiment described above is effective for situations in which the stray magnetic fields do not vary with time and in the normal situation where either the stray fields do not spatially vary much with probe position or the probe is not moved after needle insertion. However it is possible to use the gradient values to provide an indication to the user of temporally varying stray fields or if spatially inhomogeneous stray fields are present and the probe is moved significantly, and where therefore the confidence in the position detection is lower. This process is illustrated in the flow chart of FIG. 5.

Figure 5:
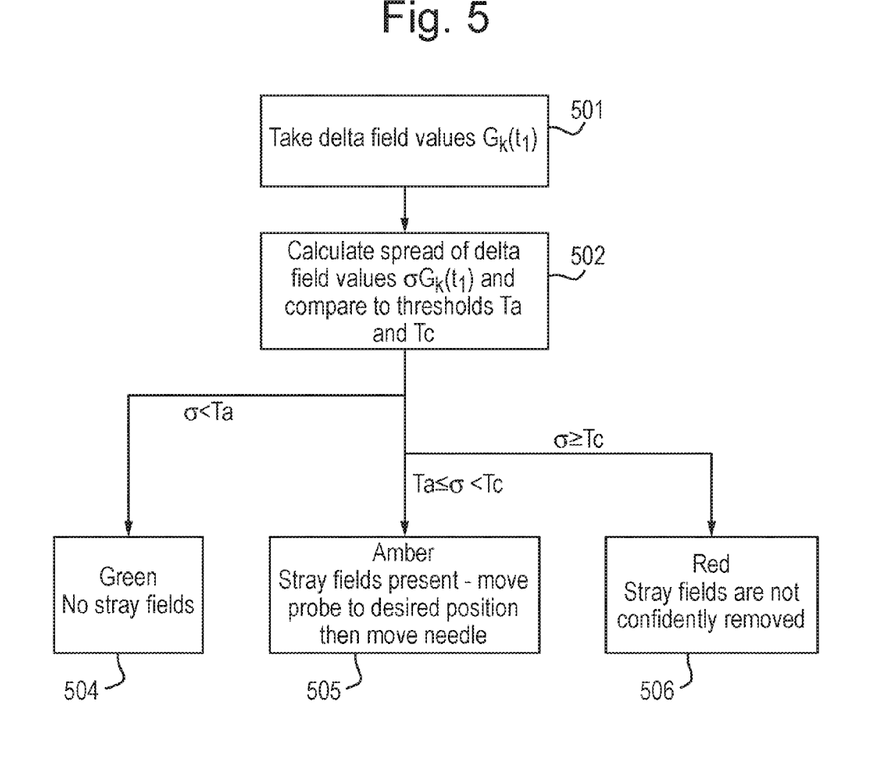
FIG. 5 is a flow diagram schematically explaining a user indicator according to one embodiment of the present invention.

In step 501 the delta field values $G_k(t_1)$ are taken and in step 502 the a measure of the spread of these values, e.g. the standard deviation of the amplitudes, is calculated i.e.:

$$\sigma_G = \sqrt{\frac{1}{N}\sum_k \left(\|G_k(t_l)\| - \left(\frac{1}{N}\sum_k \|G_k(t_l)\|\right)\right)^2}$$

Alternative measures of spread can be used. For example, rather than the standard deviation, the variance, or the mean of the strength of the delta field (especially where gradient field values are used) over all the sensors can simply be used, i.e.:

$$\text{Spread} = \frac{1}{N}\sum_k \|G_k(t_l)\|$$

Where $\|G_k\| = \sqrt{G_k(x)^2 + G_k(y)^2 G_k(z)^2}$ = the vector length.

The spread of the delta field is then compared to two thresholds Ta Tc to give an indication of the confidence in the target object position calculation. The reasoning behind this is that if the spread is very low, this indicates that there is little compensation occurring in step 403 meaning that there are no strong interfering fields and the magnetometric detectors are properly calibrated, so the position determination of the target object should be correct. If, however, the spread of the modified delta field is higher, it suggests that there are stronger interfering, stray, magnetic fields, meaning that the position detection is less likely to be correct, and confidence in it is lower.

To give the user an indication of the confidence, a coloured indicator, for example green, amber or red can be displayed to correspond to the spread being less than Ta, between Ta and Tc, or exceeding Tc. Furthermore, a more informative indication may be given to the user on how to use the system. For example, in the "green" region, with no stray magnetic fields detected, the user is free to move the ultrasound probe how they like. On the other hand in the "amber" region the user could be instructed to move the probe to the desired position and hold it steady (so that the process of FIG. 4 can then remove the influence of stray magnetic fields), and then introduce the target object, e.g. needle into the detection space. The "red" region can be associated with a message that safety is compromised.

With an example target object of a fully magnetised standard needle, values for Ta and Tc, for the spread defined as standard deviation, can be, for example, 0.25 and 0.5 respectively, though the thresholds can vary for target objects with different magnetisations.

In an alternative embodiment the spread can be compared to more thresholds or converted on a more continuous or "analogue" basis. For example, for values of the spread less than a first threshold, e.g. 0.25, a green indicator can be given indicating full confidence in the measurements. For values of the spread between 0.25 and 0.5, the indicator can fade slowly from green to orange indicating a transition into less confidence. Values of the spread from 0.5 to 1.5 can be associated with a pure orange indicator indicating a deliberately wide region where the tracking is operating but confidence is not as high. Finally, for values of the spread greater than 1.5 the indicator can be red indicating a lack of confidence. It would be possible to replace a red indicator with turning off the target object tracking, but in fact often a target object is tracked successfully even in this region.

The processing of FIG. 5 can also be used to check the calibration of the magnetometric detectors. To achieve this the ultrasound probe carrying the magnetometric detectors is positioned far away from any magnetic sources—for example at least 50 cm from any metal objects. In this position, the "green" indication meaning low spread should be displayed and any other indication can be taken to indicate incorrect calibration or a non-working magnetometric detector.

Optionally, the embodiment described above can be supplemented by further steps designed to compensate for certain failures in the magnetic tracking process. For example if the user rotates the ultrasound probe too quickly while tracking a target object, the values of the magnetic fields measured by the sensor array will substantially change. Sooner or later this results in a loss of position detection and the suspension of the updating of the background fields will cease. Thus the background fields will be updated by current magnetic field measurements, but these will include the field of the target object. The target object will then be rendered invisible by the background compensation of step 403. If, in this situation, the target object is then quickly withdrawn, the result is the production of a ghost "negative" target object at the place the real target object previously occupied. To avoid such false detections, the spread (e.g. standard deviation) of the current gradient field values $G_k(t_i)$ can be compared to the spread of the delta field $G_k(t_1)$. If the spread of the current gradient field values is less than some percentage (e.g. 90%) of the delta field, there is a high probability that the primary position detection process of steps 403 to 405 is seeing a negative ghost target object and so the delta field values stored in the buffer can be cleared to be replaced with new measurements.

The invention claimed is:

1. A magnetic position detection system comprising:
a magnetic target object,
an array of magnetometric sensors for detecting the magnetic field from the target object in a detection space, and
a data processor for receiving magnetic field measurements from the array of magnetometric sensors and calculating the position of the target object relative to the array,
the data processor being adapted to detect whether or not the target object is present in the detection space by:
fitting a magnetic field model to the magnetic field measurements by minimising differences between the magnetic field model and the magnetic field measurements, determining remaining differences between the fitted magnetic field model and the magnetic field measurements, and determining from the remaining differences whether or not the target object is present in the detection space,
wherein the magnetic field sensors and data processor are adapted to conduct periodically a background field measurement process comprising determining whether the target object is present in the detection space and, if it is not present, storing the measurements as background measurements, and wherein the magnetic field sensors and data processor are further adapted to conduct a target object position sensing process following a determination that the target object is present in the detection space, the target object position sensing process comprising the steps of correcting the magnetic field measurements for a background magnetic field by reference to the stored background measurements and fitting the magnetic field model to the corrected magnetic field measurements to perform said calculation of the position of the target object relative to the array.

2. The magnetic position detection system according to claim 1, wherein the data processor is adapted to determine whether or not the target object is present in the detection space by comparing the remaining differences to the magnetic field measurements.

3. The magnetic position detection system according to claim 1, wherein the data processor is adapted to determine whether or not the target object is present in the detection space by comparing the sum of the squares of the remaining differences to the square of the mean of the magnetic field measurements.

4. The magnetic position detection system according to claim 1, wherein the data processor is adapted to determine whether or not the target object is present in the detection space by calculating a ratio based on a sum of the remaining differences and a sum of the magnetic field measurements.

5. The magnetic position detection system according to claim 4, wherein the data processor is adapted to determine whether or not the target object is present in the detection space by comparing the calculated ratio to a threshold.

6. The magnetic position detection system according to claim 1, wherein the array of magnetometric sensors are attached to a freehand ultrasound probe of an ultrasound imaging system for imaging a subject in the detection space.

7. The magnetic position detection system according to claim 6, wherein the data processor is adapted to display the magnetically-detected position of the target object overlaid on the displayed ultrasound image of the subject.

8. The magnetic position detection system according to claim 1, wherein the magnetic field model models the field from the target object and a background magnetic field comprising the terrestrial magnetic field.

9. The magnetic position detection system according to claim 8, wherein the modelled background magnetic field comprises magnetic field influences from other magnetic objects.

10. The magnetic position detection system according to claim 1, wherein the magnetic field model models the magnetic field from the target object as originating from plural spaced magnetic monopoles.

11. The magnetic position detection system according to claim 1, wherein the magnetic field model is parametric and includes as a parameter the position of the target object relative to the sensors.

12. The magnetic position detection system according to claim 1, wherein the target object comprises one or more permanent magnets.

13. The magnetic position detection system according to claim 12, wherein at least part of the material of the target object is permanently magnetised.

14. The magnetic position detection system according to claim 12, wherein the target object has attached to it one or more permanent magnets.

15. The magnetic position detection system according to claim 1, wherein the target object is a tissue-penetrating medical tool.

16. The magnetic position detection system according to claim 15, wherein the tissue-penetrating medical tool is a needle, cannula, catheter or stylet.

17. The magnetic position detection system according to claim 1, wherein the correction of the magnetic field measurements is by subtraction from them of the stored background measurements.

18. The magnetic position detection system according to claim 1, wherein the background field measurements used in the target object position sensing process are only updated following a determination that the target object is not present in the detection space.

19. The magnetic position detection system according to claim 1, wherein the magnetic field measurement process is cyclically repeated and the measurements are stored in a buffer, the data processor being adapted to take as background field measurements magnetic field measurements stored in a previous cycle that was conducted when the target object sensing process determined that a target object was not present in the detection space.

20. The magnetic position detection system according to claim 1, wherein the magnetic field measurements are calculated as deviations from the average magnetic field measured by at least some of the magnetometric sensors.

21. The magnetic position detection system according to claim 1, wherein the data processor is further adapted to calculate the position of the target object relative to the array, including the data processor being adapted to calculate an indicator of the confidence in the calculated position by:
measuring the magnetic field in the detection space in the absence of the target object to obtain a set of magnetic field measurements;
calculating the spread of the magnetic field measurements; and
displaying to a user an indicator based on the spread to indicate the confidence in the calculated position.

22. The magnetic position detection system according to claim 21, wherein the spread of the magnetic field measurements is the standard deviation of the magnetic field measurements or the mean deviation from the average field.

23. The magnetic position detection system according to claim 21, wherein the data processor is adapted to compare the spread of the measurements to two predetermined thresholds.

24. The magnetic position detection system according to claim 21, wherein the data processor is adapted to obtain magnetic field measurements representing a background magnetic field by periodically conducting a background measurement process as herein defined.

25. The magnetic position detection system according to claim 21, wherein the data processor is adapted to determine whether a target object is present in the detection space by a method as herein defined.

26. The magnetic position detection system according to claim 21, wherein the magnetic field measurements are calculated as deviations from the average magnetic field measured by at least some of the magnetometric sensors.

27. An ultrasound imaging system comprising a magnetic position detection system according to claim 21.

28. An ultrasound imaging system comprising a magnetic position detection system, wherein the magnetic position detection system comprises:
a magnetic target object,
an array of magnetometric sensors for detecting the magnetic field from the target object in a detection space, and
a data processor for receiving magnetic field measurements from the array of magnetometric sensors and calculating the position of the target object relative to the array,
the data processor being adapted to detect whether or not the target object is present in the detection space by: fitting a magnetic field model to the magnetic field measurements by minimising differences between the magnetic field model and the magnetic field measurements, determining remaining differences between the fitted magnetic field model and the magnetic field measurements, and determining from the remaining differences whether or not the target object is present in the detection space by calculating a ratio based on a sum of the remaining differences and a sum of the magnetic field measurements.

29. The ultrasound imaging system according to claim 28, wherein the magnetic field sensors and data processor are adapted to conduct periodically a background field measurement process comprising determining whether the target object is present in the detection space, and, if it is not present, storing the measurements as background measurements, and wherein the magnetic field sensors and data processor are further adapted to conduct a target object position sensing process following a determination that the target object is present in the detection space, the target object position sensing process comprising the steps of correcting the magnetic field measurements for a background magnetic field by reference to the stored background measurements and fitting the magnetic field model to the corrected magnetic field measurements to perform said calculation of the position of the target object relative to the array.

30. A magnetic position detection system comprising:
a magnetic target object,
an array of magnetometric sensors for detecting the magnetic field from the target object in a detection space, and
a data processor for receiving magnetic field measurements from the array of magnetometric sensors and calculating the position of the target object relative to the array,
the data processor being adapted to detect whether or not the target object is present in the detection space by: fitting a magnetic field model to the magnetic field measurements by minimising differences between the magnetic field model and the magnetic field measurements, determining remaining differences between the fitted magnetic field model and the magnetic field measurements, and determining from the remaining differences whether or not the target object is present in the detection space by calculating a ratio based on a sum of the remaining differences and a sum of the magnetic field measurements.

31. The magnetic position detection system according to claim 30, wherein the data processor is adapted to determine whether or not the target object is present in the detection space by comparing the sum of the squares of the remaining differences to the square of the mean of the magnetic field measurements.

32. The magnetic position detection system according to claim 30, wherein the data processor is adapted to determine whether or not the target object is present in the detection space by comparing the calculated ratio to a threshold.

33. The magnetic position detection system according to claim 30, wherein the array of magnetometric sensors are attached to a freehand ultrasound probe of an ultrasound imaging system for imaging a subject in the detection space.

34. The magnetic position detection system according to claim 33, wherein the data processor is adapted to display the magnetically-detected position of the target object overlaid on the displayed ultrasound image of the subject.

35. The magnetic position detection system according to claim 30, wherein the magnetic field model models the field from the target object and a background magnetic field comprising the terrestrial magnetic field.

36. The magnetic position detection system according to claim 35, wherein the modelled background magnetic field comprises magnetic field influences from other magnetic objects.

37. The magnetic position detection system according to claim 30, wherein the magnetic field model models the magnetic field from the target object as originating from plural spaced magnetic monopoles.

38. The magnetic position detection system according to claim 30, wherein the magnetic field model is parametric and includes as a parameter the position of the target object relative to the sensors.

39. The magnetic position detection system according to claim 30, wherein the target object comprises one or more permanent magnets.

40. The magnetic position detection system according to claim 39, wherein at least part of the material of the target object is permanently magnetised.

41. The magnetic position detection system according to claim 39, wherein the target object has attached to it one or more permanent magnets.

42. The magnetic position detection system according to claim 30, wherein the target object is a tissue-penetrating medical tool.

43. The magnetic position detection system according to claim 42, wherein the tissue-penetrating medical tool is a needle, cannula, catheter or stylet.

44. A magnetic position detection system according to claim 30 wherein the magnetic field measurements are calculated as deviations from the average magnetic field measured by at least some of the magnetometric sensors.

45. An ultrasound imaging system comprising a magnetic position detection system according to claim 30.

* * * * *